United States Patent [19]

Brandl

[11] 4,125,639
[45] Nov. 14, 1978

[54] METHOD FOR SPRAYING PROCESSING FLUID ON INTERNAL SURFACE OF A GREEN TIRE

[75] Inventor: Josef Brandl, Mallersdorf-Pfaffenberg, Fed. Rep. of Germany

[73] Assignee: Peter Ilmberger KG, Maschinen -und Zahnradfabrik, Straubling, Fed. Rep. of Germany

[21] Appl. No.: 846,458

[22] Filed: Oct. 28, 1977

Related U.S. Application Data

[60] Continuation-in-part of Ser. No. 669,202, Mar. 22, 1976, abandoned, Division of Ser. No. 492,018, Jul. 26, 1974, Pat. No. 3,962,987.

[30] Foreign Application Priority Data

Aug. 27, 1973 [DE] Fed. Rep. of Germany ....... 2343280

[51] Int. Cl.² ............................................. B05C 7/02
[52] U.S. Cl. .................................... 427/233; 427/236
[58] Field of Search ................ 427/236, 233; 118/318, 118/44, 321, 322; 254/50.1, 50.3, 50.2

[56] References Cited

U.S. PATENT DOCUMENTS

| | | | |
|---|---|---|---|
| 2,407,806 | 9/1946 | Arnold | 244/50.1 |
| 3,346,412 | 10/1967 | Siegenthaler | 427/236 |
| 3,825,965 | 7/1974 | Root | 118/318 |

FOREIGN PATENT DOCUMENTS 167,628  6/1965  U.S.S.R. ................................... 118/318

Primary Examiner—Sam Silverberg
Attorney, Agent, or Firm—James E. Nilles

[57] ABSTRACT

A method for spraying a processing fluid on the internal surface of an unfinished or green radial tire blank includes clamping the green radial tire in a horizontal position by grasping its upper beaded edge, then grasping its lower beaded edge and pulling the tire apart to its open position where its internal surface is fully exposed, and effecting relative rotation between the tire and a fluid spraying device as the internal surface is sprayed completely, including the beaded edges.

4 Claims, 5 Drawing Figures

METHOD FOR SPRAYING PROCESSING FLUID ON INTERNAL SURFACE OF A GREEN TIRE

REFERENCE TO RELATED APPLICATION

This is a continuation-in-part of application U.S. Ser. No. 669,202, filed Mar. 22, 1976 and now abandoned, which, in turn, was a divisional application of U.S. Ser. No. 492,018, filed July 26, 1974, entitled "Apparatus For Spraying Processing Fluid On The Internal Surface Of A Green Tire" now U.S. Pat. No. 3,962,987.

BACKGROUND OF THE INVENTION

1. Field of Use

This invention relates to a method for spraying a processing liquid on the interior surface of green radial tires.

2. Description of the Prior Art

Various methods have been proposed for coating the inside of a tire with processing fluids both during manufacture and after manufacture. In some cases, the tire is "green" and in other cases it is cured. Concerning "green tires," one of the most important differences between a "green tire" and a finished tire is that the rubber of a "green tire" is still sticky, whereas the rubber of a finished tire has already been heated and cured and is no longer soft. Since the rubber of the "green tire" has not yet been hardened, the "green tire" can easily be damaged. The following patents illustrate the state of the art: U.S. Pat. Nos. 1,471,787; 2,407,806; 2,850,263; 3,346,412; 3,825,965 and U.S.S.R. Pat. No. 167,628. In U.S. Pat. No. 1,471,787, loosely journalled spreader rollers contacted the interior surface of the tire. Consequently, the rollers engaged the freshly sprayed interior and this resulted in irregularly thick layers of the spray liquid and also resulted in the formation of small, loose particles of the liquid which tend to stick to the interior surface of the tire.

U.S. Pat. No. 2,407,806 shows a mechanism with two railroad wheel-like discs to be inserted in the tire opening for contacting the two beads of the tire. The discs are then spread apart by means of a screw.

In U.S. Pat. No. 2,850,263, the tire spreader attachment was employed with finished tires and not green or unfinished tires, and that apparatus utilized a split ring for grasping and supporting the beaded edges of the tire. As a result, the entire interior of the tire, including the beaded edges, could not be thoroughly covered with the spray material.

In U.S. Pat. No. 3,346,412, there is described a method and apparatus for the spraying of the interior surface of a tire. However, this known method and apparatus is applicable only for conventional cylindrical green tires, that is for green tires which form a self-supporting (relatively rigid) cylinder, as can for instance be seen in FIG. 1 thereof. Such cylindrical green tires do not require a spreading to achieve accessibility of the interior of the tire. In the apparatus according to U.S. Pat. No. 3,346,412, the upper and lower edges of the tire are not grasped individually and moved away from each other. On the contrary, cylindrical green tires are clamped as a whole between upper and lower support plates which keep the green tire in position. These support plates do not have any gripping function at all in as far as the individual grasping of an edge of the tire is concerned, but are only brought in a line contact with the respective edge. This known apparatus and method is completely useless in as far as green tires with flexible sides (for instance radial tires) are concerned, since this known apparatus does not allow to grasp the edges of such a tire and to spread the flexible sides of the tire out. Therefore, this apparatus cannot be applied for spraying of the interior wall of a green tire having flexible sides.

In U.S. Pat. No. 3,825,965, an apparatus for cleaning the interior of tubeless tires is disclosed, in which apparatus the edges of the two side walls are set on two rotatable rims so that the tire is in a position as if it would be in its intended position on a vehicle wheel. After this positioning, the tire is then set under internal pressure as if it would be in use on a vehicle wheel. Once the tire is under pressure, a cleaning solvent is sprayed onto the interior wall of the tire by a nozzle which is arranged within the pressure chamber which is closed by the tire. Furthermore, the interior wall of the tire is brushed by a brush also arranged within the pressure chamber. Thus, this known apparatus is based on the pressurizing of the tire to bring it into a "blown-up" position and to spray the interior in this position, which principle differs completely from methods and apparatus by which the edges of a tire are clamped or gripped for holding the tire in a position for spraying and for manipulating the tire.

In USSR Author's Certificate No. 167,628 an apparatus for the spraying of the surfaces of a tire is described which shows an endless belt serving as a support on which the green tire rests in a horizontal position with its lower side wall contacting the endless belt, and which furthermore shows a gripping mechanism arranged above the tire which mechanism is apt to grip the upper edge of the upper side wall of the tire. By lifting the gripping mechanism it is intended to lift the upper side of the tire therewith and to spread the tire thereby. However, this will function only if the weight of the tire is large enough to keep the lower part of the tire resting on the transport belt while the upper side of the tire is lifted. Such a method may be applied with large and heavy tires of conventional construction. However, it does *not* function for modern radial tires. With radial tires, a spreading is possible only if both the upper edge and the lower edge of the tire are grasped individually and are then forced apart. Therefore, the apparatus known from the Russian Author's Certificate is applicable only for heavy conventional tires and is of no use for handling modern radial tires.

SUMMARY OF THE INVENTION

The general method in accordance with the invention for spraying a processing liquid on the interior surface of a green radial tire which has flexible inwardly inclined sides and beaded edges around internal edges of said sides comprises the following steps: positioning the green radial tire in a horizontal position so as to position one of the beaded edges in an upper position and the other of the beaded edges in a lower position; supporting the tire by its upper beaded edge by grasping the upper beaded edge at spaced apart locations therealong, grasping the lower beaded edge at spaced apart locations therealong and pulling the lower beaded edge downwardly thereby vertically separating the beaded edges from one another whereby the interior surface is unobstructed, positioning a processing liquid spraying means within the tire and between the beaded edges, spraying the interior surface with a processing liquid, and causing relative motion between the spraying means and the tire whereby the entire inner surface of the tire including the beaded edges are covered with processing liquid. The method further includes the step of releasing the lower beaded edge and moving the tire generally horizontally while supporting the tire in a horizontal position by continuing to grasp the upper beaded edge at spaced apart locations therealong.

The method according to the invention is especially apt for use with radial tires as they are increasingly in use, particularly in European-built cars. Such radial tires have flexible sides so that the green tire does not form a stiff hollow cylinder from one internal edge to the other internal edge as is the case with conventional green tires as, for instance, is disclosed in U.S. Pat. No. 3,346,412. One feature of the method according to the invention is that in a green tire with flexible sides, the upper beaded edge is grasped individually, that is independently of the lower beaded edge and is held by the grasping members. Another feature of the method according to the invention is that the lower beaded edge of the green tire is also grasped individually. The grasped upper and lower beaded edges are then vertically separated in the further step of the method by moving the respective grasping members away from each other. By this operation a widening of the tire is achieved such that the interior wall of the green tire is accessible from the central axis of the tire and can be sprayed. The method according to the invention can be practiced in two modifications:

(a) in the first modification, the grasping mechanism grasping the lower edge of the tire remains connected to the lower edge of the tire during the spraying procedure and thus keeps the lower edge in a certain position during the spraying;

(b) in the second modification, the lower grasping mechanis removed after the lower edge has been grasped and after the green tire has been widened due to an opposite movement of the upper and lower grasping mechanisms. The spraying takes place only after the lower grasping mechanism has then been removed. Thus, in this second modification of the inventive method, the grasping of the lower edge will take place only until the green tire is widened. This modification is apt for green tires which stay widened once they have been forceably widened by grasping their upper and lower edges and moving them apart.

Further advantages of the present invention are as follows. Some known tire painting machines are only applicable for already finished tires, but not for green tires having inwardly inclined sides, such as radial tires. If such a green tire is being transported on the conveyor its sides will almost touch each other, so that it is very difficult for the upper grasping means to clamp the tire beads neatly. According to the invention, the green radial tire is already hanging on the upper grasping means, so that because of the weight of the tire the sides of the tire don't touch each other any more. That is why the lower grasping means have a fair chance for safely clamping the lower tire beads in order to spread the whole tire.

In the aforementioned USSR patent and in U.S. Pat. Nos. 3,815,965 and 3,346,412, the machines are constructed for treating finished tires. A green tire does have a relatively soft material, which makes it very difficult to handle the tire. So far, experience indicates it is almost impossible to mount a green tire with both beads on rims by inflating the tire with air.

The present invention provides a method of supporting the tire in a horizontal position and ensuring that the spray material completely covers the interior of the green tire, including its beaded edges. The tire is supported in a horizontal position by its upper bead and the weight of the tire then aids a lower clamp element to pull the tire downwardly, thereby completely exposing the interior of the green tire. The arrangement is such that there are no obstructions located within the spread apart tire and as the relatively soft and sticky green tire is rotated, the spray material is applied to evenly and completely coat the entire inner surface of the green tire.

In a preferred form of the invention, first and second grasping devices are used for tensioning the tire rims of a green tire at least one of which may be moved away from the other to an operating position and for pulling the rims apart. In order to ensure reliable anchoring of the tensioning or grasping elements, the grasping elements of each tensioning device are fastened on a common member.

BRIEF DESCRIPTION OF THE DRAWINGS

FIG. 5 is an enlarged fragmentary view of the air motor-roller shown in FIG. 2, partially in section.

DESCRIPTION OF A PREFERRED EMBODIMENT

Figure 1:
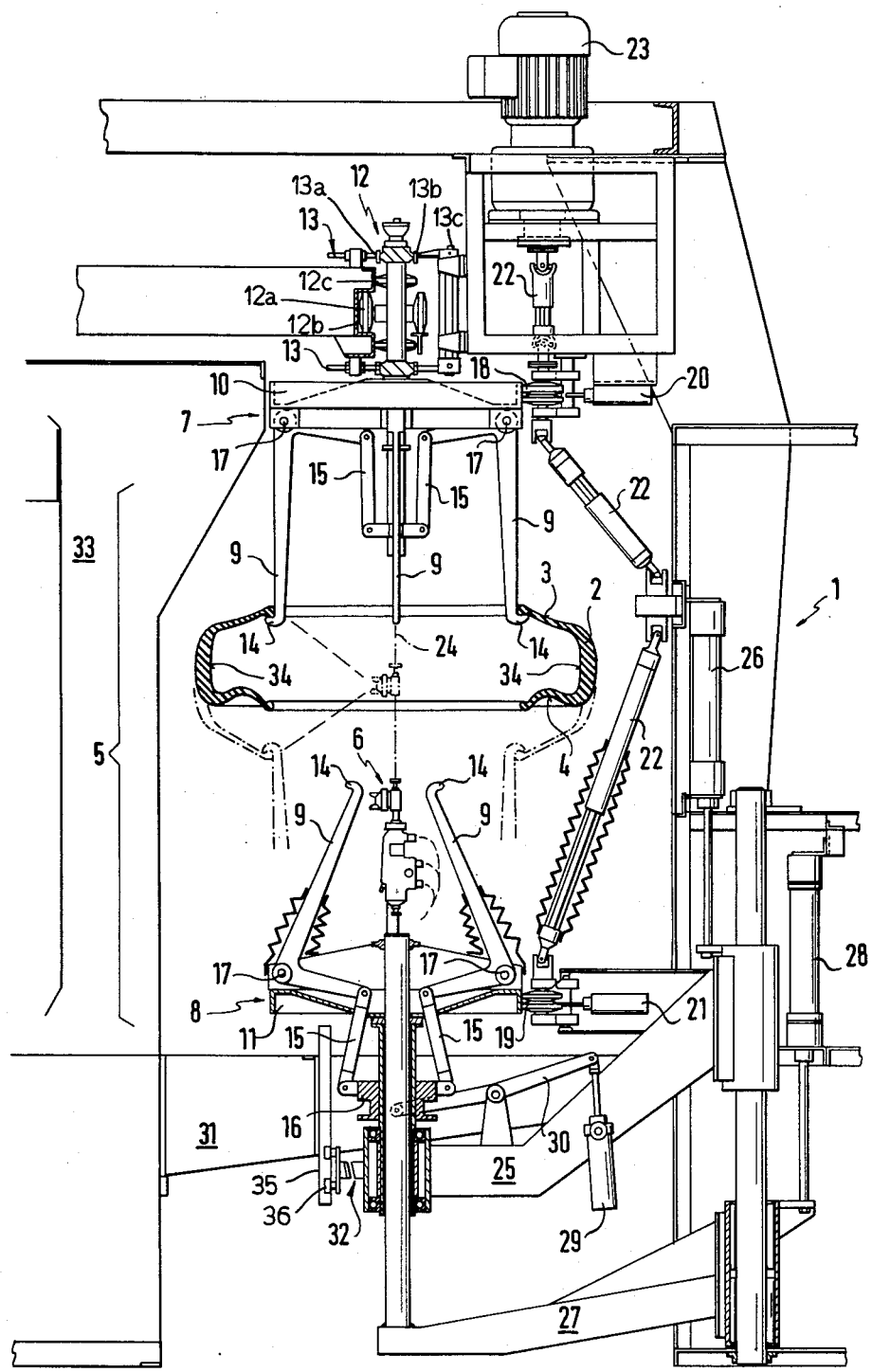
FIG. 1 is an elevation view of an apparatus for accomplishing the method of the present invention, certain parts being shown in section for the sake of clarity, and showing a tire before it is spread apart.
Figure 2:
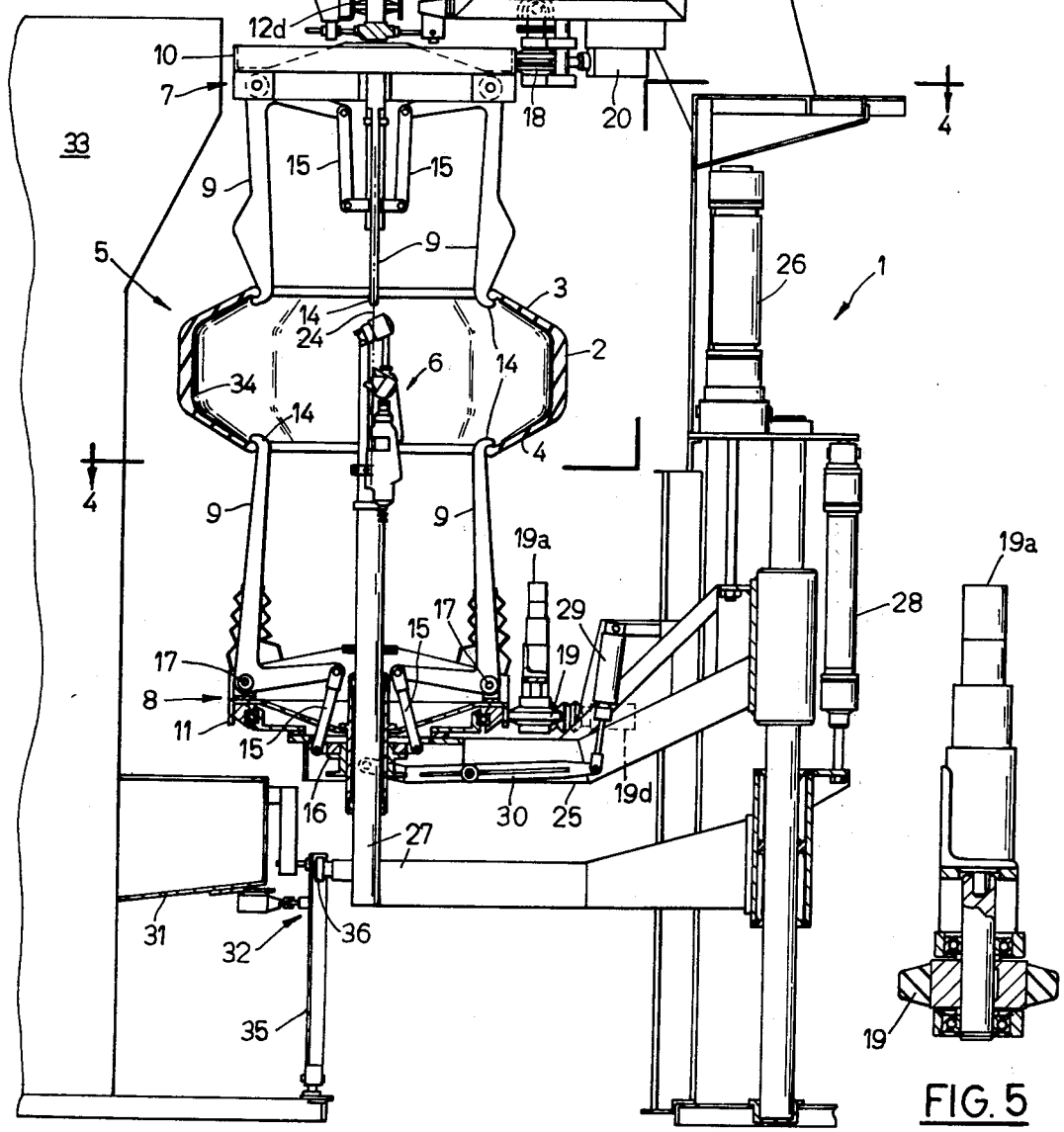
FIG. 2 is a view similar to FIG. 1, but showing a modified form for driving the lower grasping device, and also showing the tire in the spread apart position.
Figure 3:
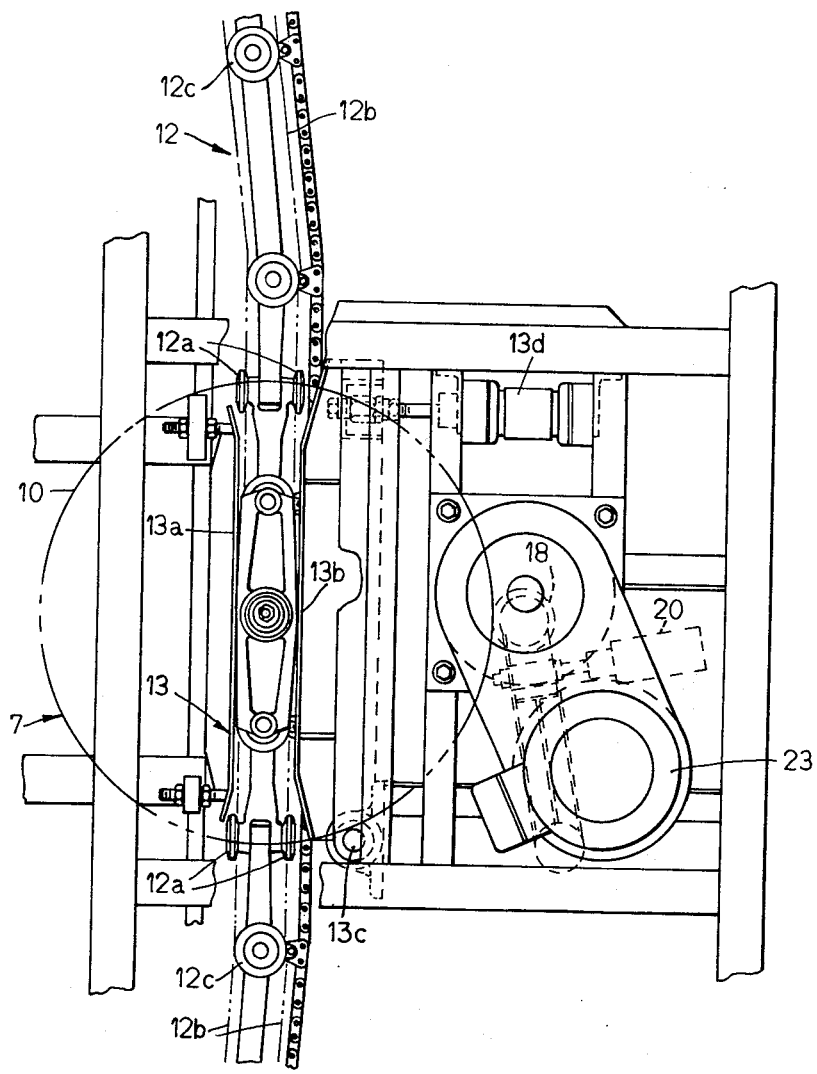
FIG. 3 is a horizontal view taken generally along the line 3—3 in FIG. 2.

The present invention relates to the coating of the interior of an unfinished or green tire and a processing fluid at this stage of the manufacture must be spread evenly on the entire internal surface of the tire, including the beaded edges of the tire. In processing a green tire, care must be exercised because it is sticky or adhesive and still soft, as compared to a finished tire which has hardened, and such a "green" tire can be easily damaged.

For the purpose of illustrating the invention, a green tire blank 2 having relatively flexible or thin side walls 3 and 4 is clamped in a horizontal position in the apparatus 1. A spreading mechanism 5 is utilized to spread the tire apart, as will appear, and a spraying system 6 is also provided centrally of the apparatus which is vertically positionable within the interior of the tire.

The spreading mechanism comprises a first grasping device 7 and a second grasping device 8 which are opposed to one another in oppositely facing, spaced relationship. Each of the grasping devices 7 and 8 has spreadable grasping elements 9 which are fastened on their common bearers 10 and 11, respectively. Each of the bearers 10 and 11 is formed in the shape of a plate and is rotatably journalled as clearly shown in the drawings. The plate 10 is fastened on a conveyer chain 12 which serves the purpose of conveying the tire blanks 2 during the processing operation. The chain 12 includes pairs of rollers 12a disposed about horizontal axes and which rollers ride in on track means 12b. The chain also has pairs of rollers 12c disposed about vertical axis and riding against track means 12d.

Means are provided for immobilizing the upper grasping device 7 at a position situated immediately above the other grasping device 8. This immobilizing or securing means 13 comprises two longitudinal guides 13a which is fixed and 13b which is pivoted at 13c and pivotally shifted by a cylinder means 13d. When it is desired to secure the upper grasping device 7 in position above the lower device 8, the cylinder means 13d swings guide 13b into contact with the chain and clamps the latter against guide 13a.

The grasping elements 9 of the two grasping devices 7 and 8 are produced in the form of angled double-armed levers which at one extremity have a grasping hook 14, while being connected at the other extremity to an intermediate lever 15. As apparent in particular in the case of the second grasping device 8, these intermediate levers 15 are connected to a slider 16 which is axially displaceable in the direction of the tire axis and whereof the displacement is accompanied by a pivotal displacement of the grasping elements 9 around their pivots 17. The rotatably arranged bearer 10, precisely like the bearer 11, has its edge in contact with a corresponding friction roller 18 or 19, which is thrust against the bearer against the force of a return spring, which is not shown, by means of a contact thrust means 20 or 21. As shown in the embodiment of FIG. 1, the two friction rollers 18 and 19 are coupled to a common driving system 23 through universal joint shafts 22. As shown in the embodiment of FIGS. 2-5, the lower roller 19 is separately driven by an air motor 19a directly connected thereto (FIG. 5).

Figure 4:
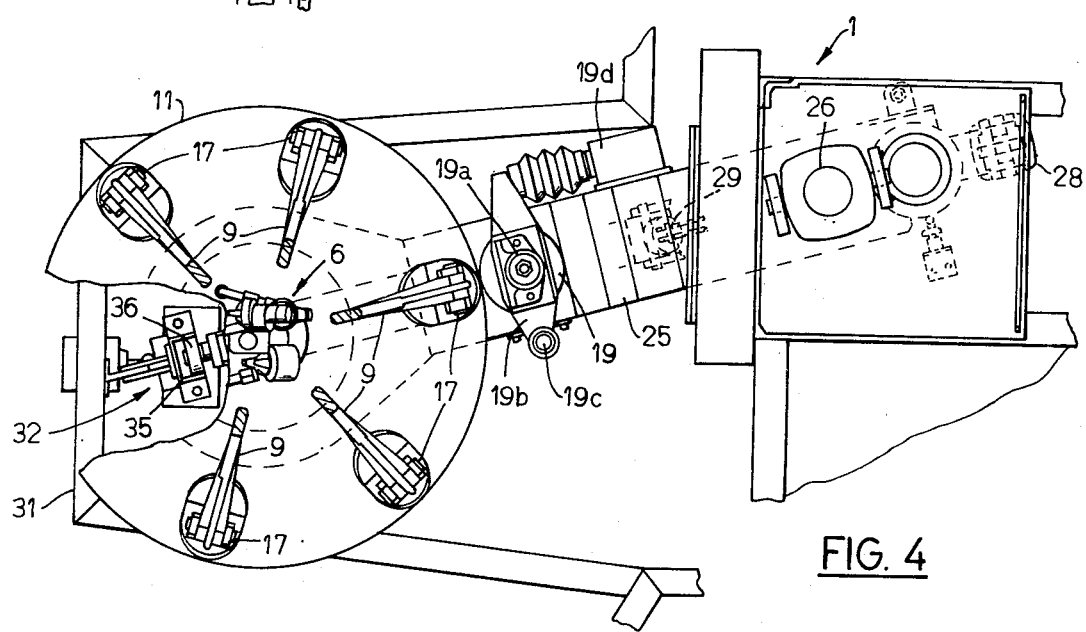
FIG. 4 is a horizontal sectional view taken along line 4—4 in FIG. 2, certain parts being shown as broken away or removed for clarity.

As shown clearly in FIG. 4, the roller 19 and the air motor 19a are mounted on a lever 19b pivoted at 19c. The lever 19b is pivotally swung by cylinder means 19d between a position for rotatably driving bearer 11 and a position away from the bearer 11.

Like the spraying system 6, the lower grasping or tensioning device 8 is arranged for axial displacement in the direction of the tire axis 24 and is thereby displaceable from the standby position shown in FIG. 1 into an operating position shown by dotted lines. To this end, the lower grasping device 8 is installed on a lever 25 which is displaceable along the tire axis 24 by means of a controllable piston-cylinder system 26.

The spraying system 6, which is centrally situated within the lower grasping means 8, is firmly secured on a lever or frame 27 which is vertically displaceable by means of a controllable piston-cylinder system 28. On the lever arm 25 is situated a piston-cylinder system 29 which is coupled to the slider 16 through a transmission lever 30.

Stabilizing means 32 provide stability during a pivoting displacement of the bearer 10 or 11, and are mounted on a framework 31 of the device. More specifically, roller means 36 is mounted on frame 27 and rides in the vertical guide track 35 carried by the main frame 31.

In the direction of the spraying action of the spraying system 6, being towards the left in the illustration shown, the framework 31 of the device has a suction system 33 receiving trickling water. The following actions occur during operation. The conveyor chain 12 offers-up a first grasping device 7 until it is positioned precisely above the second grasping device 8. The securing means 13 then come into action, i.e. it immobilizes the grasping device 7. The friction rollers 18 and 19, which had not been in contact with the bearers 10 and 11 until then, are now thrust against the bearers by means of the thrust means 20 and 21. The first grasping device 7 is already charged with a tire blank 2, i.e. the grasping hooks 14 of the grasping arms 9 enflank the upper rim of the tire blank 2 in a form fit. The tire blank 2 had been received by the first grasping device 7 at another station.

When the first grasping device has been immobilized in its position above the second grasping device, the second grasping device as well as the spraying system, are displaced upwards into the tire aperture by actuation of the piston-cylinder systems 26 and 28. An actuation of the piston-cylinder system 29 causes the grasping arms to spread apart laterally. The thrust of the grasping arms on the tire rim is adjustable by means of a separate pressure reduction device, which is not shown. When the grasping arms bear on the rim, the piston-cylinder system 26 is reversely actuated and the second grasping device 8 is drawn away downwards. The grasping hooks 14 of the grasping arms 9 then come into form-fitting contact with the second rim of the tire blank 2 and entrain the latter downwards. The force with which the tire blank is stretched may equally be adjusted by means of a separate pressure reduction device. The tire is thus spread open so far that no point of the internal surface 34 remains unsprayed during the then following spraying operation. The spraying system 6 always sprays only in the direction shown. During the spraying operation, the tire is turned in its symmetry plane by means of the friction rollers 18 and 19 and of the driving system 23. The suction device 33 receiving trickling water, serves the purpose of removing the droplets sprayed beyond the tire surface 34, by suction. The spraying operation of the spraying system is stopped once the tire has been turned through at least 360°. The grasping device 8 is raised again, whereupon the grasping arms 9 are pivoted inwards again. The second grasping device 8 returns to its standby position again, together with the spraying system 6.

In the absence of other scheduled operations, the tire blank may be removed from the first grasping device after the drying of the processing fluid sprayed on.

The invention is not limited to the example of embodiment shown. It may be envisaged, without any impediment, to equip the first grasping device with tensioning arms for both rims. It is possible moreover to envisage making the spraying device rotatable instead of the grasping device, or operating through a 360° taper nozzle.

I claim:

1. A method for spraying a processing liquid on the interior surface of a green radial tire, said green radial tire having flexible sides and beaded edges around internal edges of said sides, said method comprising:
    positioning said green radial tire in a horizontal position whereby said green radial tire has an upper and a lower beaded edge;
    charging a first grasping device having spreadable grasping elements with said tire by grasping the upper beaded edge of said tire at spaced apart locations;
    conveying said first grasping device to a position above and oppositely facing a second grasping device having spreadable grasping elements;
    grasping the lower beaded edge of said tire at spaced apart locations with said second grasping device;

vertically separating the upper and lower beaded edges by pulling on the upper and lower beaded edges; and spraying the interior tire surface.

2. A method according to claim 1 further comprising rotating said green radial tire during spraying.

3. A method for spraying a processing liquid on the interior surface of a green radial tire, said green radial tire having flexible inwardly inclined sides and beaded edges around internal edges of said sides and comprising the steps of positioning said green radial tire in a horizontal position so as to position one of said beaded edges in an upper position and the other of said beaded edges in a lower position, charging a first grasping device having spreadable grasping elements with said tire by grasping the upper beaded edge of said tire at spaced apart locations;

conveying said first grasping device to a position above and oppositely facing a second grasping device having spreadable grasping elements, grasping the lower beaded edge of said tire at spaced apart locations with said second grasping devices and pulling said lower beaded edge downwardly thereby vertically separating said beaded edges from one another whereby said interior surface is unobstructed, positioning a processing liquid spraying means within said green radial tire and between said beaded edges, spraying said interior surface with a processing liquid, and causing relative motion between said spraying means and said green radial tire whereby the entire inner surface of said green radial tire including said beaded edges are covered with processing liquid.

4. The method for spraying a processing liquid set forth in claim 3 further including the step of releasing said lower beaded edge and moving said green radial tire generally horizontal while supporting said green radial tire in a horizontal position by continuing to grasp said upper beaded edge at spaced apart locations therealong.

* * * * *